(12) United States Patent
Chen (10) Patent No.: US 9,794,451 B2
(45) Date of Patent: Oct. 17, 2017

(54) CLOUD SERVER, CONTROL EQUIPMENT AND METHOD FOR AUDIO AND VIDEO SYNCHRONIZATION

(71) Applicant: HON HAI PRECISION INDUSTRY CO., LTD., New Taipei (TW)

(72) Inventor: Po-Chin Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 51 days.

(21) Appl. No.: 15/173,743

(22) Filed: Jun. 6, 2016

(65) Prior Publication Data
US 2016/0373615 A1 Dec. 22, 2016

(30) Foreign Application Priority Data
Jun. 16, 2015 (CN) .......................... 2015 1 0333713

(51) Int. Cl.
| | |
|---|---|
| *H04N 9/475* | (2006.01) |
| *H04N 5/05* | (2006.01) |
| *H04N 21/43* | (2011.01) |
| *H04N 7/025* | (2006.01) |
| *H04N 21/426* | (2011.01) |
| *H04N 21/2368* | (2011.01) |

(Continued)

(52) U.S. Cl.
CPC ............... *H04N 5/05* (2013.01); *H04N 7/025* (2013.01); *H04N 21/2368* (2013.01); *H04N 21/242* (2013.01); *H04N 21/42684* (2013.01); *H04N 21/4307* (2013.01); *H04N 21/43635* (2013.01); *H04N 21/4432* (2013.01)

(58) Field of Classification Search
USPC ....... 348/515, 500, 512, 513, 516, 518, 521, 348/522, 525, 608, 620, 636, 669, 670, 348/680, 693, 706, 714, 719, 725, 739, 348/69, 130, 194, 231.4, 295, 423.1, 348/429.1, 425.4, 462, 464, 474, 495; 386/201, 202, 203, 207, 219, 230, 248, 386/263, 264, 270, 285, 287
See application file for complete search history.

(56) References Cited

U.S. PATENT DOCUMENTS

| | | | |
|---|---|---|---|
| 5,959,684 A | * | 9/1999 | Tan .................... H04N 21/4341 348/500 |
| 6,912,010 B2 | | 6/2005 | Baker et al. |

(Continued)

FOREIGN PATENT DOCUMENTS

| | | |
|---|---|---|
| CN | 1206536 A | 1/1999 |
| CN | 1435996 A | 8/2003 |

(Continued)

*Primary Examiner* — Jefferey F Harold
*Assistant Examiner* — Mustafizur Rahman
(74) *Attorney, Agent, or Firm* — Steven Reiss (57) ABSTRACT

A method in control equipment for synchronizing audio and video acquires an identifier of playback equipment. Information as to audio and video formats for the playback equipment is acquired playback and a first time delay data corresponding to the audio data and video data from the cloud server is set according to the identifier, the audio format information and the video format information. A first delay time between the audio data and video data according to the first time delay data acquired from the cloud server is set for the implementation of audio and video synchronization.

14 Claims, 7 Drawing Sheets

(51) Int. Cl.
*H04N 21/242* (2011.01)
*H04N 21/4363* (2011.01)
*H04N 21/443* (2011.01)

(56) References Cited

U.S. PATENT DOCUMENTS

| | | | |
|---|---|---|---|
| 8,665,320 B2 | 3/2014 | Holley | |
| 2002/0140857 A1* | 10/2002 | Limaye | G06F 15/7867 348/515 |
| 2002/0197053 A1* | 12/2002 | Nakamura | G06F 17/30787 386/249 |
| 2005/0125828 A1* | 6/2005 | Fujiwara | H04N 5/44543 725/60 |
| 2006/0156376 A1* | 7/2006 | Mukaide | H04L 29/06027 725/135 |
| 2007/0091207 A1* | 4/2007 | Aufranc | H04N 21/2368 348/462 |
| 2007/0280646 A1* | 12/2007 | Seita | H04N 5/781 386/231 |
| 2012/0019633 A1* | 1/2012 | Holley | H04N 17/04 348/53 |
| 2013/0057760 A1* | 3/2013 | Lee | H04N 21/4122 348/474 |
| 2014/0003725 A1* | 1/2014 | Kawano | G06K 9/3241 382/203 |
| 2014/0022923 A1* | 1/2014 | Gruber | H04L 1/205 370/252 |
| 2016/0309213 A1* | 10/2016 | Du | H04N 21/43637 |

FOREIGN PATENT DOCUMENTS

| | | | |
|---|---|---|---|
| CN | 101933333 A | 12/2010 | |
| TW | 201440491 A | 10/2014 | |

* cited by examiner

CLOUD SERVER, CONTROL EQUIPMENT AND METHOD FOR AUDIO AND VIDEO SYNCHRONIZATION

CROSS-REFERENCE TO RELATED APPLICATIONS

This application claims priority to Chinese Patent Application No. 201510333713.4 filed on Jun. 16, 2015, the contents of which are incorporated by reference herein.

FIELD

The subject matter herein generally relates to audio and video processing and synchronization.

BACKGROUND

With the development of audio and video processing technology, high definition multimedia interface (HDMI) audio and video programs become popular. When watching HDMI media programs, in contrast to just listening to music, more time is needed for a video processing by a playback equipment, maintaining audio and video synchronization is problematic.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Figure 1:
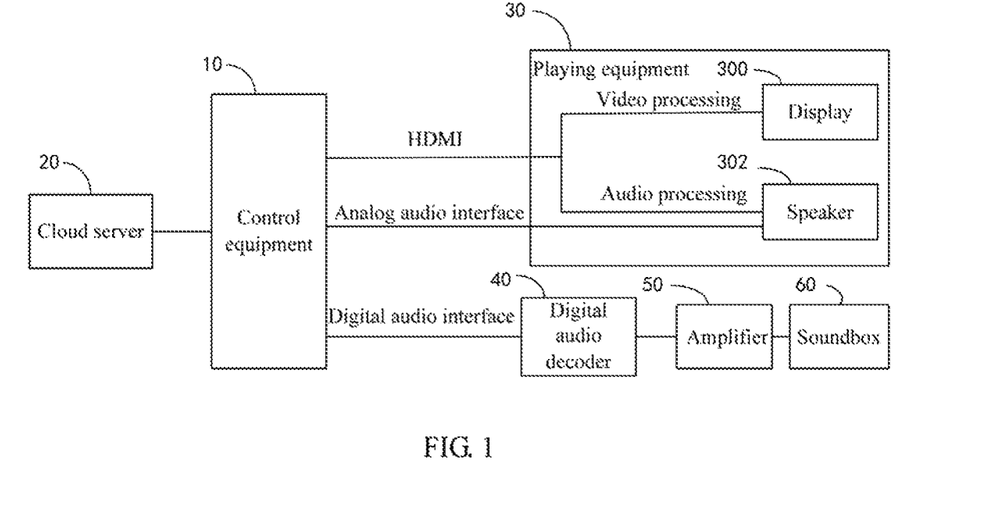
FIG. 1 illustrates a diagrammatic view of an embodiment of a control equipment 10 and a cloud server 20.

FIG. 1 illustrates a diagrammatic view of an embodiment of a control equipment 10 and a cloud server 20. In the embodiment, the applied environment includes, but is not limited to, a control equipment 10, a cloud server 20, at least one playback equipment 30, a digital audio decoder 40, an amplifier 50, and at least one soundbox 60. The playback equipment 30 and soundbox 60 are examples of playback devices, but are not limited thereto. The cloud server 20 is electrically connected to a control equipment 10. The control equipment 10 is electrically connected to a display 300 of the playback equipment 30 by a high-definition multimedia interface (HDMI), electrically connected to a speaker 302 of the playback equipment 30 by an analog audio connector, and electrically connected to the digital audio decoder 40 by a digital audio connector. The digital audio decoder 40 is electrically connected to the amplifier 50, and the amplifier 50 is electrically connected to the soundbox 60.

Figure 2:
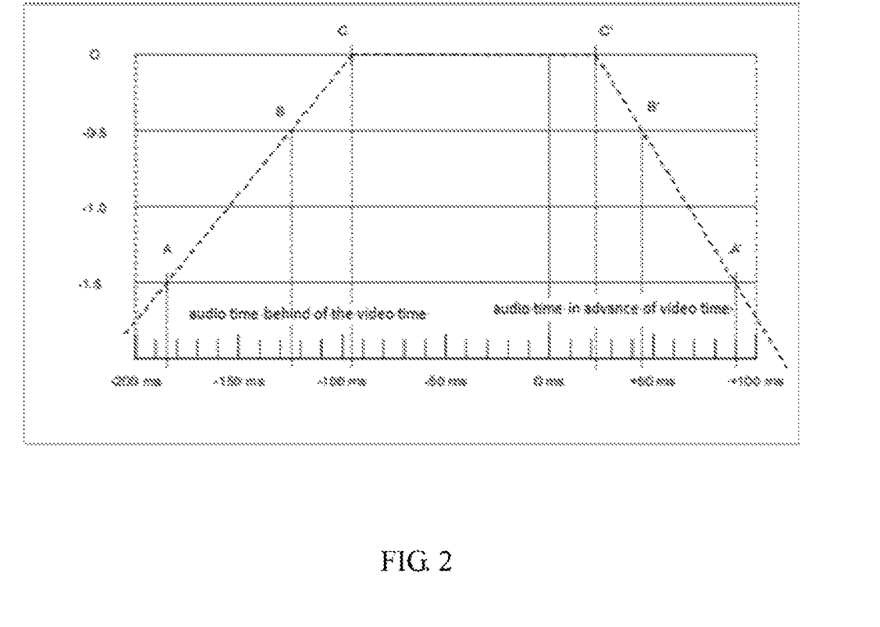
FIG. 2 illustrates a diagrammatic view of an embodiment of a performance standard for audio and video synchronization.

FIG. 2 illustrates the implementation of a performance standard for audio and video synchronization. In the coordinate graphs, horizontal coordinates represents a gap between an audio time and a video time. The 0 ms represents no gap between audio time and video time, the +50 ms represents that audio time is in advance of the video time by 50 ms, and −50 ms represents that audio time is behind the video time by 50 ms. A coordinate gap between A and A' represents a acceptable performance threshold of delay time synchronization. A coordinate gap between B and B' represents that in the International Telecommunication Union Wireless Communication Group open standard BT.1359, 45 ms can be a threshold time for audio time being in advance of the video time, and 125 ms can be the threshold time that audio time can lag behind the video time. These thresholds are one condition of synchronization performance. A coordinate gap between C and C' represents stable synchronization of audio and video requiring no performance testing.

Figure 3:
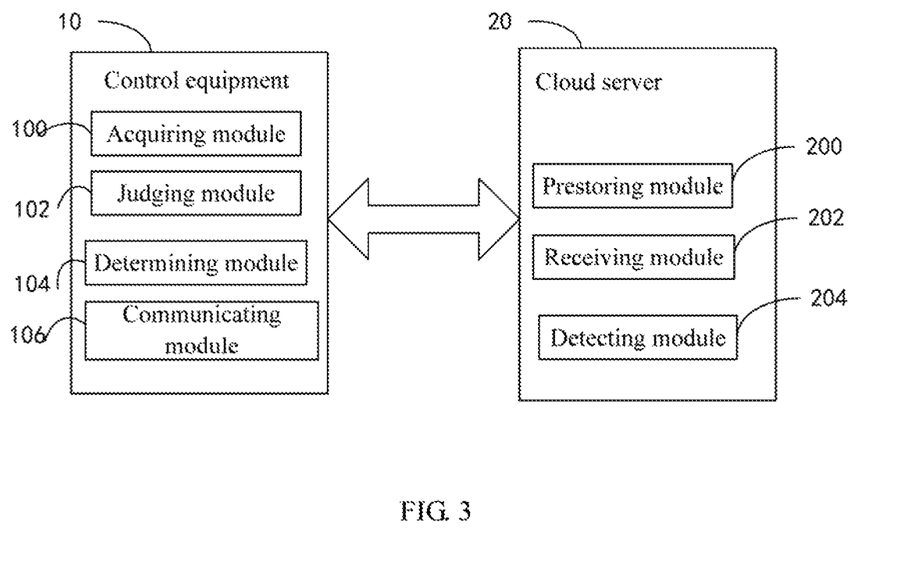
FIG. 3 illustrates a block diagram of an embodiment of function modules of the control equipment 10 and the cloud server 20.

FIG. 3 illustrates a block diagram of an embodiment of function modules of the the control equipment 10 and the cloud server 20. The control equipment 10 includes an acquiring module 100, an adjusting module 102, a determining module 104, and a communicating module 106. The cloud server 20 includes a prestoring module 200, a receiving module 202, a detecting module 204.

The acquiring module 100 acquires an extended display identification data of the playback equipment 30. The extended display identification data includes a time delay table, and the time delay table includes an identifier of the playback equipment 30, an audio time delay, a video time delay, an interlacing audio time delay, and an interlacing video time delay. The acquiring module 100 acquires a first format information of the audio transmitted by the control equipment 10 and a second format information of the video transmitted by the control equipment 10, and acquires a first time delay data corresponding to the audio data and video data from the cloud server 20 according to the identifier, the first format information of the audio, and the second format information of the video.

The adjusting module 102 sets a first delay time of the audio data and video data according to the first time delay data acquired from the cloud server 20 to implement the audio and video synchronization. Delay time setting includes a first synchronization between HDMI audio data and HDMI video data, a second synchronization between digital audio data and digital video data, and a third synchronization between analog audio data and analog video data.

The determining module 104 determines whether an audio and video synchronization is implemented. When audio and video synchronization is implemented, the communicating module 106 transmits a second time delay data corresponding to the audio data and video data presently to the cloud server 20. Otherwise, when audio and video synchronization is not implemented, the determining module 104 determines whether the control equipment 10 has a function of detecting time delay between audio data and video data. When the control equipment 10 has the function of detecting such time delay, the time delay test function of the control equipment 10 will be enabled. In the embodiment, the time delay test function is executed by a video detecting module 108 and an audio detecting module 110. The adjusting module 102 does a adjustment to implement audio and video synchronization according to the third time delay data after the video detecting module 108 and the audio detecting module 110 acquire a third time delay data corresponding to the audio data and video data tested automatically. Then, the determining module 104 determines whether an audio and video synchronization is implemented. When the audio and video synchronization is not implemented, a user interface will automatically display. When audio and video synchronization is implemented, the communicating module 106 transmits the second time delay data corresponding to the audio data and video data presently to the cloud server 20. When the control equipment 10 has no function of detecting time delay between audio and video, and a fourth time delay data set by users on the interface which was automatically displayed will be acquired continuously. The adjusting module 102 evaluates audio and video synchronization according to the third time delay data until the audio data and video data synchronization is implemented, and transmits the third time delay data to the cloud server 20. The cloud server 20 receives and updates the third time delay data.

A working process is as follows. The prestoring module 200 of the cloud server 20 prestores a time delay table, wherein the time delay table stores a first delay time of the audio data and video data of different playback equipments with the process of starting audio, video decoding, and playback back different formats of audio data and video data. The playback equipments can be distinguished through their identifiers. The time delay table provides a first time delay data for the control equipment 10. The receiving module 202 of the cloud server 20 receives the extended display identification data of the playback equipment 30 and a second time delay data returned by the control equipment 10. The detecting module 204 determines whether the second time delay data returned by the playback equipment is automatically detected by the control equipment 10. When the second time delay data returned by the playback equipment is automatically detected by the control equipment, the detecting module 204 updates the time delay table correspondingly. When multiple sets of data for second time delay are automatically detected, the detecting module 204 calculates a mean value of the multiple sets and updates the time delay value corresponding to the playback equipment at the time delay table according to the mean value.

When the second time delay data returned by the playback equipment is not automatically detected, the detecting module 204 determines whether the first time delay data is set by users. When the first time delay data is not set by users, the detecting module 204 acquires a third time delay data according to the extended display identification data of the playback equipment 30 and transmits the third time delay data to the control equipment 10. Otherwise, when the time delay data is set by users, the detecting module 204 determines whether the first time delay data set by users is within a predetermined range. When the first time delay data set by users is within a predetermined range, the detecting module 204 classifies the first time delay data into groups according to the identifier, the first format information of the audio, and the second format information of the video, counts a quantity of each of the groups and determines whether the quantity exceeds a predetermined value. When the quantity exceeds the predetermined value, the detecting module 204 calculates the mean value according to the first time delay data set by users and updates the time delay table correspondingly, according to the mean value. For example, the detecting module 204 can determine whether the first time delay data is smaller than half of the second time delay data of the cloud server or is larger than twice the second time delay data of the cloud server. The detecting module 204 does no processing when the first time delay data is smaller than half of the second time delay data of the cloud server or is larger than twice the second time delay data of the cloud server. However, when the first time delay data is between half of the second time delay data of the cloud server and twice the value of the second time delay data of the cloud server, the detecting module 204 classifies the first time delay data into groups according to the identifier, the first format information of the audio, and the second format information of the video. There may be many varieties of playback equipment, the audio format, and the video format. Different users use different playback equipments to play different types of audio data and video data. The first time delay data is set differently when users use different playback equipments to play different audio data and video data. The cloud server 20 is connected to multiple control equipments, so the cloud server 20 can receive multiple first time delay data sets by several users using the same kind of playback equipment. In order to increase accuracy of time delay data, the detecting module 204 calculates the mean value according to the first time delay data received by multiple control equipment and sets the mean value as the new time delay data.

Figure 4:
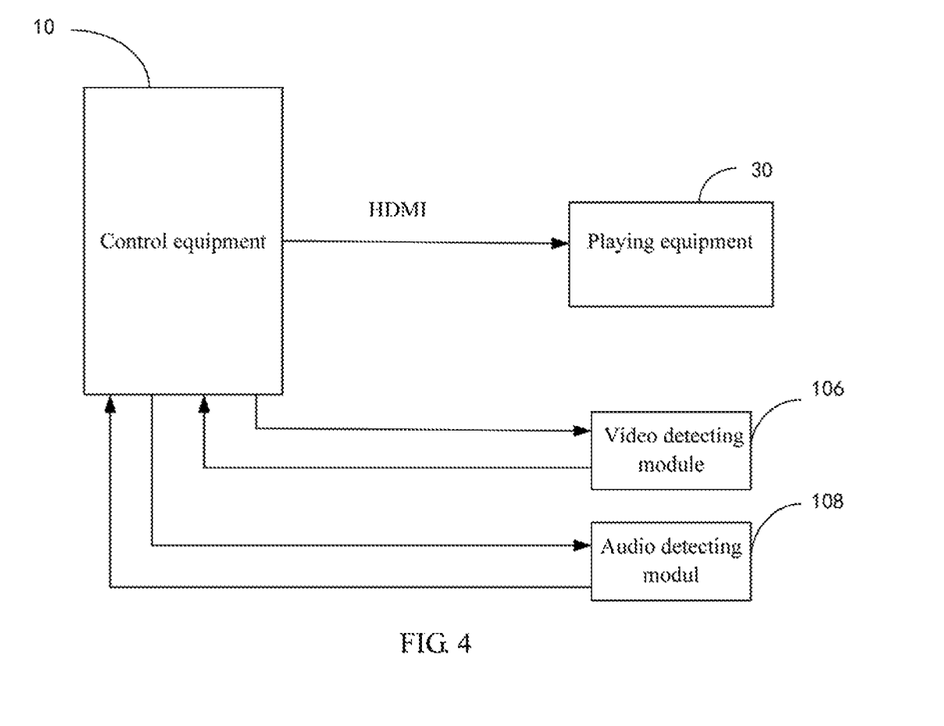
FIG. 4 illustrates a diagrammatic view of an embodiment of the control equipment 10 automatically detecting time delay of audio data and video data.

FIG. 4 illustrates a diagrammatic view of an embodiment of the control equipment 10 automatically detecting time delay between audio data and video data. The control equipment 10 sends the same audio data and video data to the playback equipment 30 by a HDMI connector. For example, when video data is switched from full screen of black to full screen of blank, audio data is transmitted with the video data being transmitted. The playback equipment 30 receives audio data and video data from the control equipment 10, transmits the video data to a display 300 to playback and transmits the audio data to a speaker to play back. The video detecting module 108 receives a first command from the control equipment 10 to detect the brightness, and the audio detecting module 110 receives a second command from the control equipment 10 to detect the audio data. The video detecting module 108 detects a first switching time when the brightness level changes and transmits the first switching time to the control equipment 10. The audio detecting module 110 detects a second switching time when the voice level changes and transmits the second switching time to the control equipment 10. The control equipment 10 compares value of difference between the first switching time and the second switching time, so the time delay of the control equipment 10 can be controlled according to the difference value. For example, when audio time is in advance of the video time by Xms, the control equipment 10 controls the time delay of the audio to be Xms so that the playback equipment 30 can keep the audio and video synchronous. When audio time is lagging behind the video time by Yms, the control equipment 10 controls the time delay of the video to be Yms so that the playback equipment 30 can synchronize audio and video.

Figure 5:
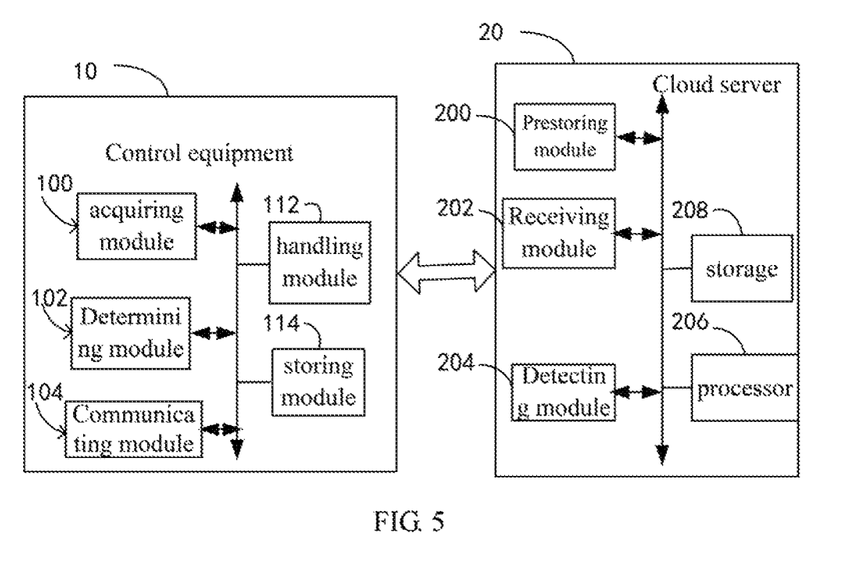
FIG. 5 illustrates a block diagram of another embodiment of function modules of the control equipment 10 and the cloud server 20.

FIG. 5 illustrates a block diagram of another embodiment of function modules of the control equipment 10 and the cloud server 20. In the embodiment, the control equipment 10 includes an acquiring module 100, a determining module 104, a communicating module 106, a handling module 112, and a storing module 114. The cloud server 20 includes a prestoring module 200, a receiving module 202, a detecting module 204, a processor 206, and a storage 208. The acquiring module 100, the determining module 104, the communicating module 106, the prestoring module 200, the receiving module 202, and the detecting module 204 are configured to have the functions illustrated in FIG. 3.

Figure 6:
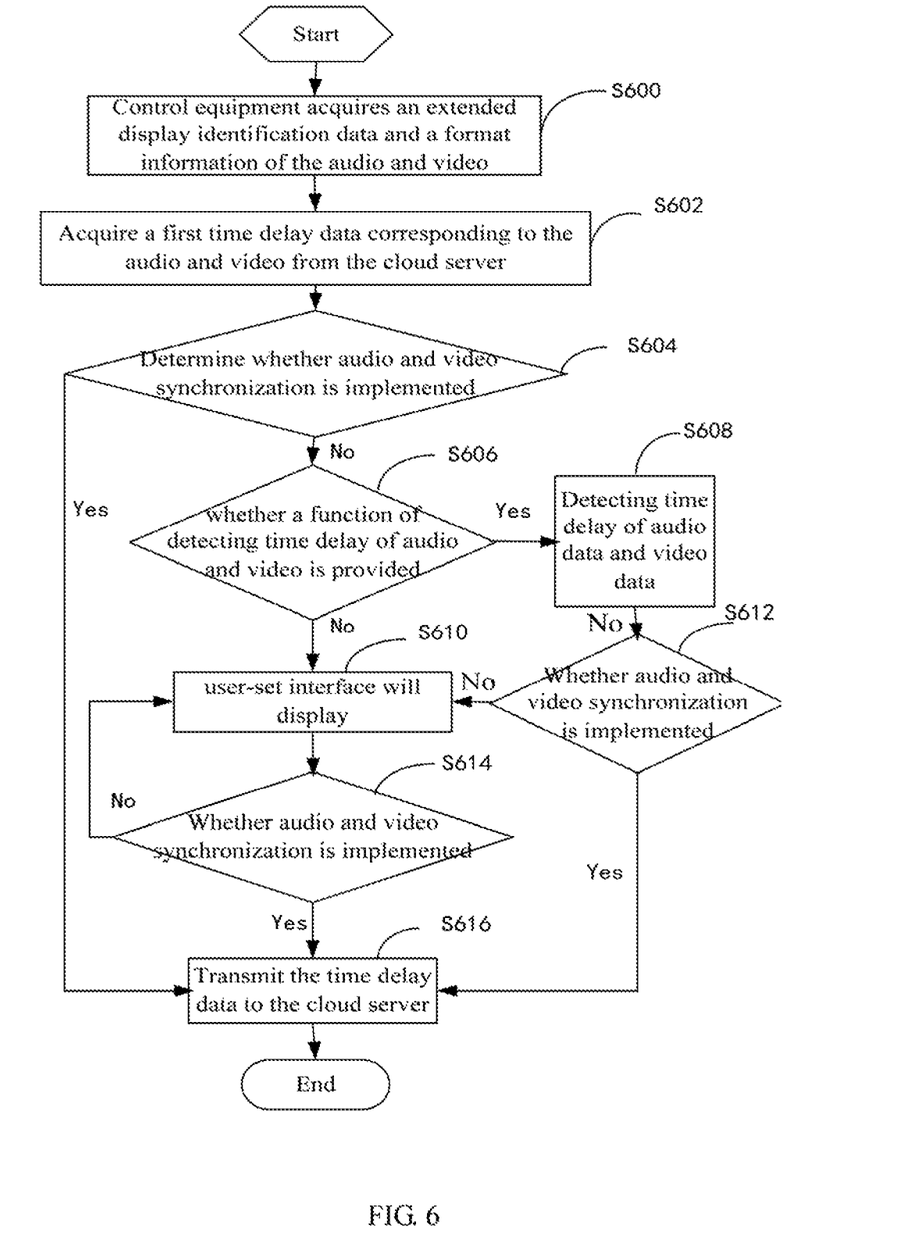
FIG. 6 illustrates a flowchart of an embodiment of a method for audio and video synchronization implemented by the control equipment 10.

FIG. 6 illustrates a flowchart of an embodiment of a method for audio and video synchronization implemented by the control equipment 10. The method can be implemented by the function modules 100-106 as in FIG. 3 or by the function modules 100-114 as in FIG. 5. The processor 206 executes these modules to realize the flowchart. The flowchart is provided by way of example, as there are a variety of ways to carry out the flowchart. The flowchart described below can be carried out using the configurations illustrated in FIG. 6, for example, and various elements of these figures are referenced in explaining the flowchart. Each block shown in FIG. 6 represents one or more processes, methods, or subroutines, carried out in the exemplary flowchart. Additionally, the illustrated order of blocks is by example only and the order of the blocks can change. The flowchart can begin at block 400.

At block 600, the acquiring module 100 of the control equipment 10 acquires an extended display identification data of the playback equipment 30 and a first format information of audio data and a second format information of video data transmitted by the control equipment 10.

At block 602, the acquiring module 100 acquires a first time delay data corresponding to the audio data and video data from the cloud server 20 according to the identifier, the first format information of the audio and the second format information of the video.

At block 604, the adjusting module 102 sets a first delay time of the audio data and video data according to the first time delay data acquired from the cloud server 20 to implementing audio and video synchronization.

At block 606, the determining module 104 determines whether audio and video synchronization is implemented. When audio and video synchronization is implemented, block 616 will be executed.

At block 608, when audio and video synchronization is implemented, the determining module 104 determines whether the control equipment 10 has a function of detecting time delay of audio data and video data. When the control equipment 10 has the function of detecting time delay of audio data and video data, the time delay test function of the control equipment 10 will be enabled. In the embodiment, the time delay test function is executed by a video detecting module 108 and an audio detecting module 110.

At block 610, when the control equipment 10 has no function of detecting time delay of audio data and video data, the user-set interface will be displayed for setting time delay data, and a second time delay data set by users will be acquired continuously.

At block 612, the determining module 104 determines whether audio and video synchronization is implemented. When audio and video synchronization is implemented, block 616 will be executed.

At block 614, the determining module 104 determines whether audio and video synchronization is implemented. When audio and video synchronization is not implemented, the adjusting module 102 does a judgment to implement audio and video synchronization according to the second time delay data until audio and video synchronization is not implemented, and transmits a third time delay data to the cloud server 20. The cloud server 20 receives and updates the third time delay data.

At block 616, the communicating module 106 transmits a fourth time delay data corresponding to the audio data and video data presently to the cloud server 20.

Figure 7:
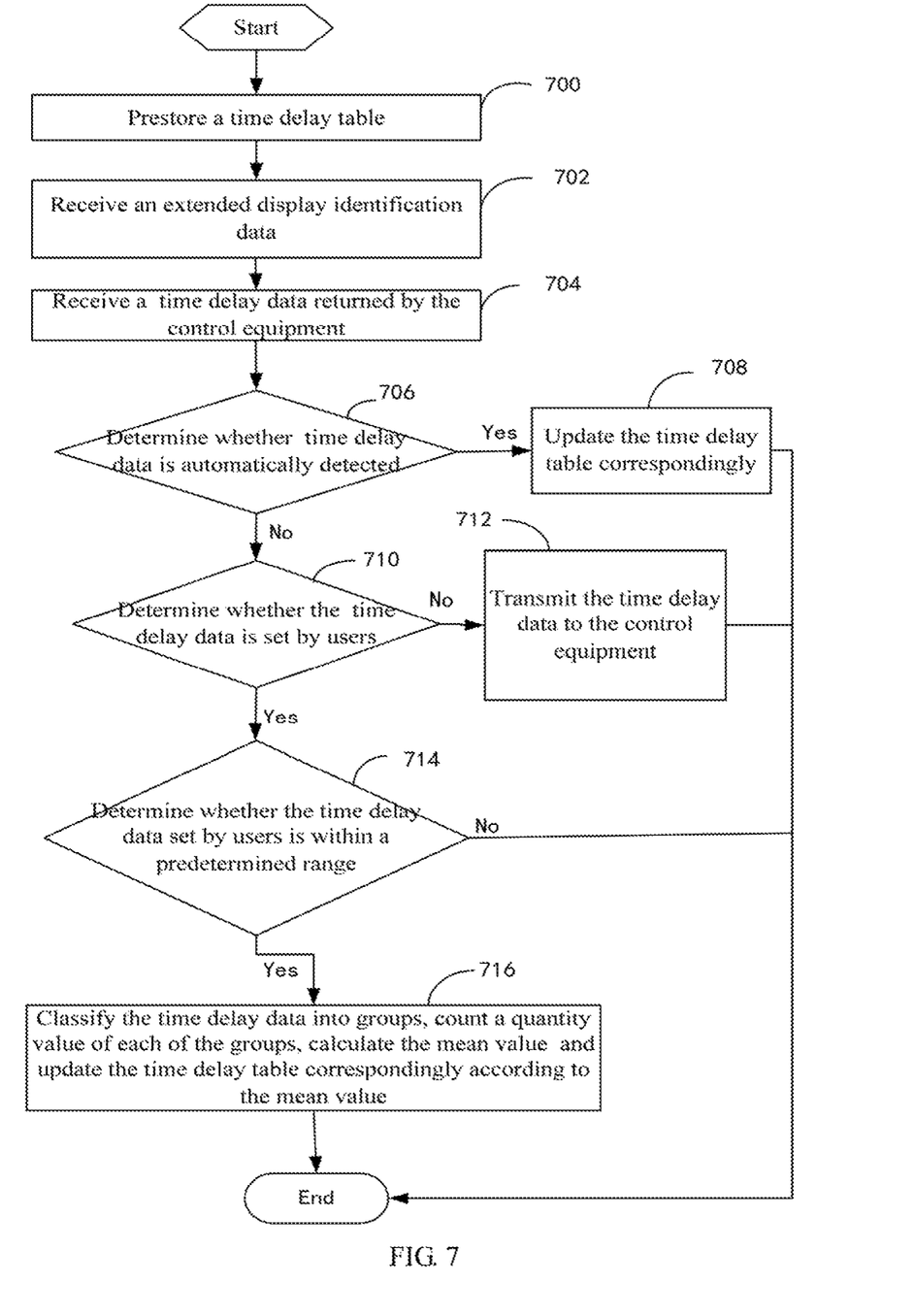
FIG. 7 illustrates a flowchart of an embodiment of a method for audio and video synchronization implemented by the cloud server 20.

FIG. 7 illustrates a flowchart of an embodiment of a method for audio and video synchronization implemented by the cloud server 20. Additionally, the illustrated order of blocks is by example only and the order of the blocks can change. The flowchart can begin at block 700.

At block 700, the prestoring module 200 of the cloud server 20 prestores a time delay table, wherein the time delay table stores a first delay time of the audio data and video data of different playback equipments with the process of starting audio, video decoding and playing for different formats of audio data and video data. The playback equipments can be distinguished through their identifiers. The time delay table provides a first time delay data for the control equipment 10.

At block 702, the receiving module 202 of the cloud server 20 receives the extended display identification data of the playback equipment 30

At block 704, the receiving module 202 of the cloud server 20 receives a second time delay data returned by the control equipment 10.

At block 706, the detecting module 204 determines whether a third time delay data returned by the playback equipment is automatically detected by the control equipment 10.

At block 708, when the third time delay data returned by the playback equipment is automatically detected by the control equipment, the detecting module 204 updates the time delay table correspondingly. When multiple third time delay data are automatically detected, the detecting module 204 calculates a mean value according to the third multiple time delay data and updates the time delay value corresponding to the playback equipment at the time delay table according to the mean value.

At block 710, when the third time delay data returned by the playback equipment is not automatically detected, the detecting module 204 determines whether the third time delay data is set by users.

At block 712, when the third time delay data is not set by users, the detecting module 204 acquires a fourth time delay data according to the extended display identification data of the playback equipment 30 and transmits the fourth time delay data to the control equipment 10.

At block 714, when the time delay data is set by users, the detecting module 204 determines whether the third time delay data set by users is within a predetermined range. When the third time delay data set by users is not within a predetermined range, nothing is need to do.

At block 716, when the third time delay data set by users is within a predetermined range, the detecting module 204 classifies the third time delay data into groups according to the identifier, the first format information of the audio and the second format information of the video, counts a quantity value of each of the groups, calculates the mean value according to the third time delay data set by users and updates the time delay table correspondingly according to the mean value.

Currently, there may be many varieties of playback equipment, the audio format, and the video format. Different users use different playback equipments to play different audio data and video data. The third time delay data is set differently when users use different playback equipments to play different audio data and video data. The cloud server 20 is connected to multiple control equipments, so the cloud server 20 can receive multiple third time delay data set by several users using the same kind of playback equipment. In order to increase accuracy of time delay data, the detecting module 204 calculates the mean value according to the third time delay data received by multiple control equipments and sets the mean value as the new time delay data.

By executing blocks above, the control equipment 10, the cloud server 20 and the method of implementing audio and video synchronization can improve a shortcoming that at HDMI criterion audio data and video data synchronization and acquire the optimum time delay data to implement audio and video synchronization according to the identifier, the first format information of the audio and the second format information of the video of the playback equipment. The cloud server 20 can receive multiple time delay data automatically detected by the control equipment or set by users and calculate a mean value according to the multiple time delay data, furthermore, the cloud server 20 updates the time delay value corresponding to the playback equipment at the time delay table according to the mean value to solve the problem that audio and video synchronization is not implemented when users watch HDMI multimedia image.

The embodiments shown and described above are only examples. Many details are often found in the art such as the other features of a device and method for handing multimedia situation. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A control equipment electronically connected to a cloud server and a playback equipment, wherein the control equipment transmits audio data and video data, the control equipment comprising:
   at least one processor;
   a storage unit; and
   one or more programs that are stored in the storage unit and executed by the at least one processor, the one or more programs comprising instructions for:
   acquiring an identifier of the playback equipment;
   acquiring a first format information of the audio data transmitted by the control equipment and a second format information of the video data transmitted by the control equipment;
   acquiring a first time delay data corresponding to the audio data and video data from the cloud server according to the identifier, the first format information and the second format information;
   setting a first delay time of the audio data and video data according to the first time delay data acquired from the cloud server to implement audio and video synchronization;
   determining whether the audio and video synchronization is implemented; and
   transmitting a second time delay data corresponding to the audio data and video data to the cloud server when the audio and video synchronization is implemented.

2. The control equipment as claimed in claim 1, wherein the one or more programs further comprises instructions for: detecting a third delay time of audio processing of the playback equipment when audio and video synchronization is implemented; detecting a fourth delay time of video processing of the playback equipment when audio and video synchronization is implemented; and setting a fifth delay time of the audio data and video data according to the second delay time of audio processing and the third delay time of video processing.

3. The control equipment as claimed in claim 2, wherein the one or more programs further comprises instructions for:
   providing a user interface for setting a third time delay data when audio and video synchronization is not implemented;
   setting a sixth delay time of the audio data and video data according to the third time delay data.

4. A cloud server electronically connected to a control equipment and a playback equipment, wherein the control equipment transmits audio data and video data, the cloud server comprising:
   at least one processor;
   a storage unit; and
   one or more programs that are stored in the storage unit and executed by the at least one processor, the one or more programs comprising instructions for:
   pre-storing a time delay table, wherein the time delay table stores a first delay time of the audio data and video data of different playback equipment with the process of starting audio, video decoding and playing for different formats of audio data and video data;
   receiving an identifier uploaded by the playback equipment;
   receiving a first format information of the audio data and a second format information of video data transmitted by the playback equipment;
   acquiring a first time delay data corresponding to the audio data and video data from the time delay table according to the identifier, the first format information of the audio data and the second format information of the video data; and transmitting the first time delay data to the control equipment.

5. The cloud server as claimed in claim 4, wherein the one or more programs further comprises instructions for:

acquiring a second time delay data from the playback equipment;

determining whether the second time delay data returned by the playback equipment is automatically detected by the control equipment; and updating the time delay table correspondingly when the second time delay data returned by the playback equipment is automatically detected by the control equipment.

6. The cloud server as claimed in claim 5, wherein the one or more programs further comprises instructions for:

calculating a mean value according to the multiple second time delay data when multiple second time delay data are automatically detected; and updating a first time delay value corresponding to the playback equipment at the time delay table according to the mean value.

7. The cloud server as claimed in claim 5, wherein the one or more programs further comprises instructions for:

determining whether the first time delay data is set by users;

determining whether the first time delay data is within a predetermined threshold range when the first time delay data is set by users;

classifying the first time delay data into groups according to the identifier, the first format information of the audio and the second format information of the video when the first time delay data is within a predetermined range;

counting a quantity value of each of the groups;

determining whether the quantity value exceeds a predetermined value;

calculating the mean value according to the first time delay data when the quantity value exceeds the predetermined value; and updating the time delay table correspondingly according to the mean value.

8. A method of implementing audio and video of control equipment synchronization, wherein the control equipment is electronically connected to a cloud server and a playback equipment, wherein the control equipment transmits audio data and video data to the playback equipment, the method comprising:

acquiring an identifier of the playback equipment;

acquiring a first format information of the audio data transmitted by the control equipment and a second format information of the video data transmitted by the control equipment;

acquiring a first time delay data corresponding to the audio data and video data from the cloud server according to the identifier, the first format information of the audio data and the second format information of the video data;

setting a first delay time of the audio data and video data according to the first time delay data acquired from the cloud server to implement audio and video synchronization;

determining whether audio and video synchronization is implemented; and transmitting a second time delay data corresponding to the audio data and video to the cloud server when audio and video synchronization is implemented.

9. The method as claimed in claim 8, wherein the method further comprising: detecting a third delay time of audio processing of the playback equipment when audio and video synchronization is implemented; and detecting a fourth delay time of video processing of the playback equipment when audio and video synchronization is implemented; and setting a fifth delay time of the audio data and video data according to the third delay time of audios processing and the fourth delay time of video processing.

10. The method as claimed in claim 9, wherein the method further comprising:

providing a user interface for setting a third time delay data when audio and video synchronization is implemented;

setting a sixth delay time of the audio data and video data according to the third time delay data.

11. A method of implementing audio and video of a cloud server synchronization, wherein the cloud server is electronically connected to a control equipment and a playback equipment, wherein the control equipment transmits audio data and video data to the playback equipment, the method comprising:

pre-storing a time delay table, wherein the time delay table stores a first delay time of the audio data and video data of different playback equipment with the process of starting audios, video decoding and playing for different formats of audio data and video data;

receiving an identifier uploaded by the playback equipment;

receiving a first format information of the audio data and a second format information of video data transmitted by the playback equipment;

acquiring a first time delay data corresponding to the audio data and video data from the time delay table according to the identifier, the first format information of the audio data and the second format information of the video data; and transmitting a second time delay data to the control equipment.

12. The method as claimed in claim 11, wherein the one or more programs further comprises instructions for:

acquiring a third time delay data returned by the playback equipment;

determining whether the third time delay data returned by the playback equipment is automatically detected by the control equipment; and updating the time delay table correspondingly when the third time delay data returned by the playback equipment is automatically detected by the control equipment.

13. The method as claimed in claim 12, wherein the one or more programs further comprises instructions for:

calculating a mean value according to the multiple third time delay data when multiple third time delay data are automatically detected; and updating the time delay value corresponding to the playback equipment at the time delay table according to the mean value.

14. The method as claimed in claim 12, wherein the one or more programs further comprises instructions for:

determining whether the third time delay data is set by users;

determining whether the third time delay data is within a predetermined range when the third time delay data is set by users;
classifying the third time delay data into groups according to the identifier, the first format information of the audio data and the second format information of the video data when the third time delay data is within a predetermined threshold range;
counting a quantity value of each of the groups;
determining whether the quantity value exceeds a predetermined value;
calculating the mean value according to the third time delay data when the quantity value exceeds the predetermined value; and
updating the time delay table correspondingly according to the mean value.

* * * * *